United States Patent [19]

Hamilton et al.

[11] Patent Number: 5,787,159
[45] Date of Patent: Jul. 28, 1998

[54] USE OF CALLER ID INFORMATION

[76] Inventors: Chris Hamilton, 41 Harrison Ave., Montclair, N.J. 07042; Bill Tiso, 12 Crystal Rock Rd., Sparta, N.J. 07871

[21] Appl. No.: 607,796

[22] Filed: Feb. 27, 1996

[51] Int. Cl.$^6$ .................................................. H04M 3/64
[52] U.S. Cl. ............................... 379/201; 375/67; 375/142
[58] Field of Search ....................... 379/67, 88, 89, 379/77, 142, 201, 221, 207

[56] References Cited

U.S. PATENT DOCUMENTS 5,416,835  5/1995  Lee ........................................ 379/201
5,440,615  8/1995  Caccuro et al. ......................... 379/67
5,479,488  12/1995  Lennig et al. ......................... 379/213
5,511,112  4/1996  Szlam ..................................... 379/77
5,533,100  7/1996  Bass et al. ............................. 379/67

*Primary Examiner*—Daniel S. Hunter
*Attorney, Agent, or Firm*—Kaplan & Gilman, LLP

[57] ABSTRACT

An improved voice processing system is described which utilizes caller ID information, or portions thereof, in order to change processing parameters utilized by the voice processing system to process future signals received during a telephone call.

2 Claims, 2 Drawing Sheets

USE OF CALLER ID INFORMATION

TECHNICAL FIELD

This invention relates to voice processing, and more particularly, to an improved technique of utilizing information transmitted to a called terminal prior to said called terminal changing to an off hook state.

BACKGROUND OF THE INVENTION

Recently, in telephony, it has become a common practice to transmit information to a called terminal either prior to a ring signal being transmitted or in between ring signals. The information transmitted is typically in the form of a digital bit stream and is commonly termed caller ID. The most well known application of caller ID is to display on the called party's telephone, or a peripheral device, the telephone number and possibly the name of the calling party. This helps in avoiding prank phone calls, as well as being a convenient technique to simply know in advance who is calling.

Another use for caller ID information is to locate a dealer or service representative. For example, if a consumer calls an 800 number in order to determine the xyz widget dealer closest to his home, a caller ID unit can (i) determine the phone number from which the user is calling, (ii) map that phone number to a geographical area, and (iii) advise the caller of the widget dealership closest to that geographical area.

In other applications, the caller ID is used to determine to which of a plurality of agents a call is to be routed. For example, if there are fifty agents, one for each state, the caller ID can be used to first determine from which state the customer is calling, and then route that caller to the agent responsible for that state.

Several other known systems utilize caller ID in one form or another. However, it can be appreciated to those of ordinary skill in this art that there are potential applications of caller ID which have not yet been exploited.

SUMMARY OF THE INVENTION

The present application is an extension of caller ID applications which allows a voice processing system receiving incoming calls to better adapt operating parameters based upon information contained within the caller ID or similar information conveyed prior to the called terminal entering the off hook state. Specifically, the caller ID data is used to estimate characteristics of signals to be received after call completion. Thereafter, various processing parameters of the voice processing system are changed and/or adapted based upon expected characteristics of signals to arrive after the telephone call is answered. The processing parameters are then chosen to optimally correspond to such signal characteristics.

In one embodiment, the caller ID is used to determine from which country an arriving call was initiated. This information permits a signal processing algorithm for detection of dial pulse digits (DPD) to be optimized based upon the expected different characteristics of DPD digits received from different countries.

In a second embodiment, a voice processing system which has speech recognition capability is adapted based upon the country from which the call was initiated. For example, if the caller ID information shows that the call arriving was initiated from France, the voice recognition algorithm for recognizing french speech is loaded. Alternatively, if the caller ID shows that the call was initiated from Great Britain, then the voice recognition algorithm which recognizes British English is loaded instead.

DETAILED DESCRIPTION OF THE PREFERRED EMBODIMENT

Figure 1:
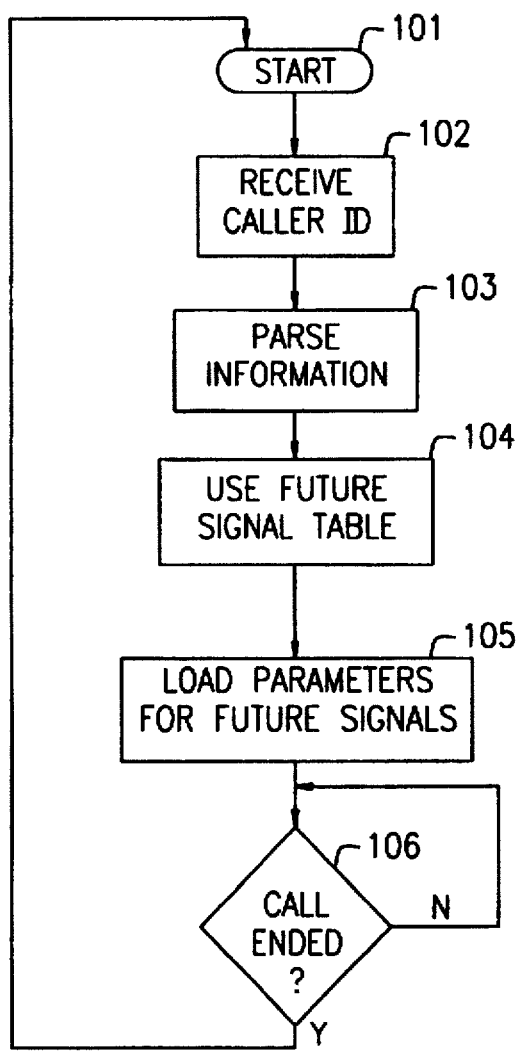
FIG. 1 shows a flow chart which can be utilized to implement appropriate software for practice of the present invention.

FIG. 1 shows a flow chart which may be utilized to implement the present invention. The flow chart is intended to be a very high level block diagram, but each block is readily implemented by those of ordinary skill in this art.

The flow chart is entered at 101 and control is transferred to block 102 where the caller ID is received. Depending upon the particular protocol, the caller ID may be received prior to the first ring, or between ring signals. In any event, block 103 next extracts the appropriate caller ID, which includes country code, area code, telephone number etc. This digital information is then transferred to block 104 where a table look up is performed.

The table look up may include, for example, determining which language should be used for a speech recognition algorithm based upon the country code, or determining from the caller ID information, which, of a plurality of possible DPD algorithms, should be used for detection of future DPD digits. Numerous other possibilities exist, however, all share the property that operating parameters of the voice processing system are changed based upon expected characteristics of signals to be received in the future during the telephone call being initiated.

Considering first the case where the caller ID is used to select a DPD algorithm, some countries utilize a DPD signal which provides for varying pulse rates, while some countries utilize a DPD signal which provides for a fixed pulse rate, to within a very small tolerance. While algorithms for each type of DPD signal exist, known voice processing systems are typically programmed to use a particular algorithm based upon the country in which they are installed. However, if a call is received from a different country, utilizing a different DPD standard, the voice processing systems of the prior art will use the same programmed algorithm. This results in poor performance, including excess talkoff. The present invention solves the problem by utilizing the caller ID information to identify the country of origin of the call, and to then utilize the appropriate DPD algorithm.

Once the appropriate parameters are located through the table look up, they are loaded into the voice processing systems working memory at block 105. Thereafter, the system operates as is typical and well known to those of ordinary skill in the art. At decision point 106, the algorithm continually checks for the end of the call, and when that occurs, simply returns to start 101. The parameters can remain loaded to be overwritten during future calls, or can be discarded by simply resetting all of the memory locations in which such parameters are stored.

Figure 2:
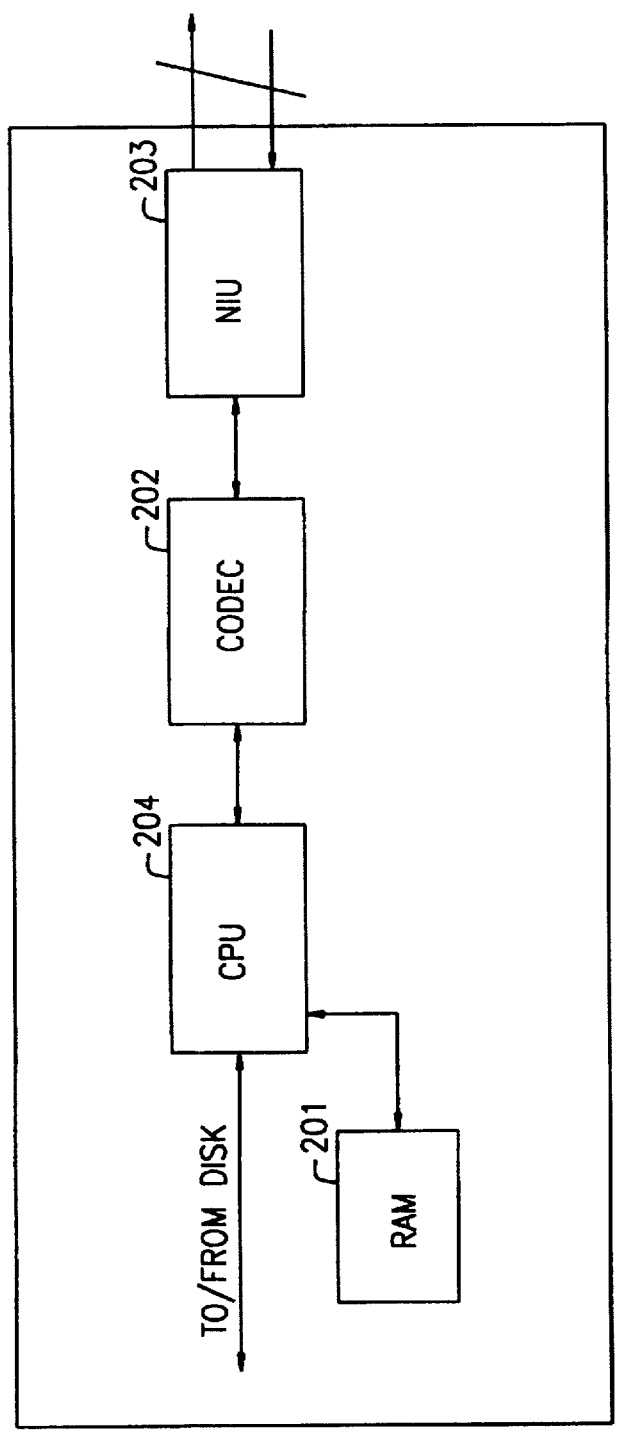
FIG. 2 shows a block diagram of the basic components of a voice processing board suitable for use in implementing the present invention.

FIG. 2 shows a basic block diagram of a typical voice processing system circuit card as used in a PC environment. The card includes working memory 201, a CODEC 202, an NIU 203, as well as a processor 204. All of these components are well known in the art, and indeed, typical voice boards and the installation of these boards into PC computer based systems is a rapidly expanding field with many practical systems presently in place.

In accordance with the present invention, CPU 204 extracts the caller ID information and utilizes a table look up, preferably stored in RAM 201, in order to determine the appropriate parameters to be utilized in future processing of signals to be received via NIU 203 and CODEC 202. Several sets of these parameters are preferably stored on the computer's hard disk. (Not shown) As previously explained, after it is determined which parameters are to be utilized, these parameters are read from the hard disk into CPU 204 and placed into RAM 201 for use during processing of the telephone call. By estimating the signal characteristics of signals to be received in the future, the voice processing system can utilize processing parameters which optimally correspond to said characteristics.

In another embodiment, the caller ID information is used to change the language of an outgoing greeting or other message. By identifying the country of origin of the caller, an appropriate language can be selected. Moreover, the caller ID can also identify the language of the particular user. Specifically, consider a credit card holder who calls in for information regarding his account. The credit card holder, when he applied for the credit card, filled in his primary language. Thereafter, when the credit card holder calls the voice processing system for information concerning his account, the caller ID is used to identify the caller and determine his primary language. The information is then read out in the appropriate language.

In still another embodiment, the invention can be combined with a text-to-speech system. For example, consider a stored file representing English text. If a remote caller telephones the system caller ID information is transmitted, such information can be used to identify the country\language associated with the caller. Next, a conventional electronic dictionary translates the English text into the caller's language, and the text-to-speech operates from the translated text.

While the above describes the preferred embodiment of the invention, it will be apparent to those of skill in this art that various other modifications and/or additions are readily implemented. For example, other characteristics of the future signal may be estimated and the voice processing system can be adapted in any way to maximize the efficiency in processing such future signals.

We claim:

1. An automatic voice processing system comprising: means for extracting information from a signal indicating an origin of an incoming telephone call prior to answering said call; and means for utilizing said information to estimate signal characteristics of future signals indicative of DPD dialed digits to be received during said incoming telephone call and for processing said future signals with different signal processing algorithms to extract data therefrom, said signal processing algorithms being selected based upon the information indicating an origin of an incoming call, said signal processing algorithm being selected to optimally correspond with said expected signal characteristics of said DPD dialed digits, said signal processing algorithms being adapted to detect DPD digits.

2. In an automatic voice processing system, a method of processing incoming digits comprising:

extracting information from a signal indicating an origin of an incoming telephone call prior to answering said call; and utilizing said information to estimate signal characteristics of future signals indicative of dialed digits to be received during said incoming telephone call and processing said future signals with different signal processing algorithms based upon the information indicating an origin or an incoming call.

* * * * *